(12) United States Patent
Lee et al.

(10) Patent No.: US 8,406,349 B2
(45) Date of Patent: Mar. 26, 2013

(54) METHOD AND APPARATUS FOR RECEIVING SIGNAL FOR MIMO SYSTEM

(75) Inventors: Yuro Lee, Daejeon (KR); Jong-Ee Oh, Daejeon (KR); Minho Cheong, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 314 days.

(21) Appl. No.: 12/808,726

(22) PCT Filed: Jun. 5, 2008

(86) PCT No.: PCT/KR2008/003163
§ 371 (c)(1),
(2), (4) Date: Jun. 17, 2010

(87) PCT Pub. No.: WO2009/078512
PCT Pub. Date: Jun. 25, 2009

(65) Prior Publication Data
US 2010/0266072 A1    Oct. 21, 2010

(30) Foreign Application Priority Data
Dec. 19, 2007   (KR) .......... 10-2007-0133823

(51) Int. Cl.
*H04L 27/06* (2006.01)
(52) U.S. Cl. ........ 375/341; 375/260; 375/262; 375/267; 375/299; 375/340; 375/347; 455/101; 455/132; 455/500; 455/562.1; 370/210; 370/334; 370/344; 370/464; 370/480; 714/794; 714/795; 714/796
(58) Field of Classification Search .......... 375/260, 375/262, 267, 299, 340, 341, 347; 455/101, 455/132, 500, 562.1; 370/210, 334, 344, 370/464, 480; 714/794, 795, 796
See application file for complete search history.

(56) References Cited

U.S. PATENT DOCUMENTS

| 7,489,746 B1 * | 2/2009 | Awater et al. ............... 375/341 |
| 2006/0276212 A1 | 12/2006 | Sampath et al. |

(Continued)

FOREIGN PATENT DOCUMENTS

| KR | 1020060012825 A | 2/2006 |
| KR | 1020070063919 A | 6/2007 |
| KR | 1020070118835 A | 12/2007 |

OTHER PUBLICATIONS

Hiroyuki Kawai et al., "Likelihood Function for QRM-MLD Suitable for Soft-Decision Turbo Decoding and Its Performance for OFCDM MIMO Multiplexing in Multipath Fading Channel", IEICE Trans. Commun., Jan. 2005, pp. 47-57, vol. E88-B, No. 1, 2005 The Institute of Electronics, Information and Communication Engineers.
International Search Report for PCT/KR2008/003163 filed Jun. 5, 2008.

(Continued)

*Primary Examiner* — Leon Flores

(57) ABSTRACT

Provided is a method and apparatus for receiving a signal for a MIMO system. The receiving apparatus includes: a QR decomposer for calculating a unitary matrix Q, an upper triangle matrix R, and a vector size for a received signal; a multiple dimension detector for calculating a first LLR for an output of the QR decomposer through multiple dimension detection; an inverse matrix and weight calculator for calculating an inverse matrix for the upper triangle matrix R and a weight; an interference remover for regenerating a symbol for a demodulated data stream using the fist LLR and removing interference from an output vector of the QR decomposer using the regenerated symbol; and a weight zero forcing unit for performing zero forcing on the interference removed output vector from the interference remover using the inverse matrix of the upper triangle matrix R and the weight and calculating a second LLR.

17 Claims, 13 Drawing Sheets

U.S. PATENT DOCUMENTS

| | | | |
|---|---|---|---|
| 2008/0025429 A1* | 1/2008 | Lee et al. | 375/267 |
| 2008/0240299 A1* | 10/2008 | Huang et al. | 375/332 |
| 2009/0046011 A1* | 2/2009 | Tung et al. | 342/377 |
| 2010/0272220 A1* | 10/2010 | Murai et al. | 375/346 |

OTHER PUBLICATIONS

Written Opinion of the International Searching Authority for PCT/KR2008/003163 filed Jun. 5, 2008.

* cited by examiner

Fig. 5

| LTF1 | LTF2 | LTF3 | LTF4 | LTF5 | LTF6 | LTF7 | LTF8 | SIG | DATA0 | DATA1 | DATA2 | DATA3 |

METHOD AND APPARATUS FOR RECEIVING SIGNAL FOR MIMO SYSTEM

TECHNICAL FIELD

The present invention relates to a method and apparatus for receiving a signal for a multiple input multiple output (MIMO) system; and, more particularly, to a method and apparatus for receiving a signal for a MIMO system, which improve reception performance with hardware complexity reduced by re-generating a symbol corresponding to a data stream demodulated by a multidimensional detector and demodulating remaining signals after removing the re-generated symbols from a received signal.

This work was supported by the IT R&D program of MIC/IITA [2006-S-002-02, "IMT-Advanced Radio Transmission Technology with low Mobility"].

BACKGROUND ART

It is a requirement of a wireless communication system to transmit a large amount of high quality multimedia data using a limited frequency. As a method for transmitting a large amount of data using a limited frequency, a multiple input and multiple output (MIMO) system was introduced. The MIMO system forms a plural of independent fading channels using a multiple antenna at receiving and transmitting ends and transmits different signals through each of transmitting antennas, thereby significantly increasing a data transmission rate. Accordingly, the MIMO system can transmit a large amount of data without expansion of a frequency.

However, the MIMO system has a shortcoming that the MIMO system is too fragile for inter-symbol interference (ISI) and frequency selective fading. In order to overcome the shortcoming, an orthogonal frequency division multiplexing (OFDM) scheme was used. The OFDM scheme is the most proper modulation scheme for transmitting data at a high speed. The OFDM scheme transmits one data row through a subcarrier having a low data transmission rate.

A channel environment for wireless communication has multiple paths due to obstacles such as a building. In a wireless channel environment having multi-paths, delay spray is generated due to the multiple paths. If a time of delay spray is longer than a time of transmitting a next symbol, inter-symbol interference (ISI) is generated. In this case, fading is selectively generated in a frequency domain (frequency selective fading). In case of using single carrier, an equalizer is used to remove the ISI. However, complexity of the equalizer increases if a data transmission rate increases.

The shortcomings of the MIMO system can be attenuated using an orthogonal frequency division multiplexing (OFDM) technology. In order to overcome the shortcomings of the MIMO system with the advantages of the MIMO system maintained, an OFDM technology was applied to a MIMO system having N transmitting antennas and N receiving antennas. That is, a MIMO-OFDM system was introduced.

FIGS. 1 and 2 are a block diagram schematically illustrating a multiple input multiple output (MIMO) orthogonal frequency division multiplexing (OFDM) system. FIG. 1 is a block diagram of a transmitting end in the MIMO-OFDM system, and FIG. 2 is a block diagram of a receiving end in the MIMO-OFDM system.

Referring to FIG. 1, the transmitting side includes a serial/parallel (S/P) converter, a plurality of encoders 102, a plurality of quadrature amplitude modulation (QAM) mappers 103, a plurality of inverse fast fourier transform (IFFT) units 104, a plurality of cyclic prefix (CP) inserters 105, and digital/analog and radio frequency (D/A & RF) converting units 106. The S/P converter divides transmission data into a plurality of data rows before encoding the transmission data. The plurality of encoders 102 encode the data rows. After encoding, the plurality of QAM mappers 103 modulate the encoded data rows based on a predetermined modulation scheme such as binary phase shift keying (BPSK), quadrature phase shift keying (QPSK), 16 QAM, and 64 QAM. The plurality of IFFT units 104 transform the modulated symbols into time domain signals. The plurality of CP inserters 105 insert a CP code for a guard interval into the time domain signals. Then, the plurality of D/A & RF converting units 106 convert the CP inserted digital signals to analog signals and covert the analog signals to RF signals. The RF signals are transmitted through an antenna.

Referring to FIG. 2, the receiving side includes a plurality of analog/digital and radio frequency (A/D & RF) converting units 107, a plurality of CP removers 108, a plurality of fast fourier transform (FFT) units 109, a MIMO receiver, a plurality of decoders 111, and a P/S converter 112. The plurality of A/D & RF converting units 107 convert RF signals to analog signals and convert the analog signals to digital signals. The plurality of CP removers 108 remove CP codes which were inserted for a guard interval and transfer the CP code removed signals to the FFT units 109. The plurality of FFT units 109 perform FFT on the input parallel signals which are the CP removed signals. The MIMO receiver 110 estimate transmission data symbols which are generated by FFT. The MIMO receiver 110 calculates a log likelihood ratio (LLR) from the estimated symbols. The plurality of decoders 111 decode each of data rows transferred from the MIMO receiver 110 and estimate the transmission data. The plurality of P/S converters 112 convert parallel data modulated by each decoder 111 to serial data.

The MIMO receiver 110 generally uses a decision feedback equalizer (DFE), zero forcing (ZF), minimum mean square error estimation (MMSE), and bell labs layered space-time (BLAST). As described above, the MIMO receiver has a problem of low performance although the MIMO receiver has a comparative simple structure compared to maximum likelihood detection (MLD).

DISCLOSURE OF INVENTION

Technical Problem

An embodiment of the present invention is directed to providing a method and apparatus for receiving a signal for a MIMO system, which improve reception performance with hardware complexity reduced by re-generating a symbol corresponding to a data stream demodulated by a multidimensional detector and demodulating remaining signals after removing the re-generated symbols from a received signal.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a receiving apparatus of an orthogonal frequency division multiplexing (OFDM) based multiple input multiple output (MIMO) system, including: a QR decomposer for calculating an unitary matrix Q, an upper triangle matrix R, and a vector size for a received signal; a multiple dimension detector for calculating a first log likelihood ratio (LLR) for an output of the QR decomposer through multiple dimension detection; an inverse matrix and weight calculator for calculating an inverse matrix for the upper triangle matrix R and a weight; an interference remover for regenerating a symbol for a demodulated data stream using the fist LLR and removing interference from an output vector of the QR decomposer using the regenerated symbol; and a weight zero forcing unit for performing zero forcing on the interference removed output vector from the interference remover using the inverse matrix of the upper triangle matrix R and the weight and calculating a second LLR.

The receiving apparatus may further include a signal field detector for receiving an output vector of the QR decomposer and detecting a signal field from the output vector.

The receiving apparatus may further include a first decoder for performing demodulation using the first LLR outputted and the multiple dimension detector, and a second decoder for performing demodulation using the second LLR outputted from the weight zero forcing unit.

In accordance with another aspect of the present invention, there is provide a receiving method of an OFDM based MIMO system, including: performing QR decomposing for calculating an unitary matrix Q, an upper triangle matrix R, and a vector size for a received signal; calculating a first LLR by performing multiple dimension detection on the result of said the QR decomposing; calculating an inverse matrix for the upper triangle matrix R and calculating a weight; regenerating a symbol for a demodulated data stream using the fist LLR and removing interference from the result of the QR decomposing using the regenerated symbol; and performing zero forcing on the interference removed output vector using the inverse matrix of the upper triangle matrix R and the weight and calculating a second LLR.

The receiving method may further include: detecting a signal field from the result of the QR decomposing.

In accordance with still another embodiment of the present invention, there is provided a receiving apparatus of an OFDM based MIMO system, including: a QR decomposing unit for decomposing an unitary matrix Q and an upper triangle matrix R from a received signal; a multiple dimension detecting unit for deciding a $m^{th}$ symbol and a $(m-1)^{th}$ symbol through performing multiple dimension detection on an output of the QR decomposing unit; an interference removing unit for regenerating a symbol corresponding to a demodulated data stream using an output of the multiple dimension detecting unit and removing interference from the output of the QR decomposing using the regenerated symbol; and a weight zero forcing unit for performing zero forcing on the interference removed output vector using an inverse matrix of an upper triangle matrix R and a weight.

In accordance with further another embodiment of the present invention, there is provided a receiving method of an OFDM based MIMO system, including: decomposing an unitary matrix Q and an upper triangle matrix R from a received signal; deciding a $m^{th}$ symbol and a $(m-1)^{to}$ symbol through performing multiple dimension detection on an output of said decomposing; regenerating a symbol corresponding to a demodulated data stream using the output of said deciding and removing interference from the output of said QR decomposing using the regenerated symbol; and performing zero forcing on the interference removed output vector using an inverse matrix of an upper triangle matrix R and a weight.

Advantageous Effects

A receiving method and apparatus for a multiple input multiple output (MIMO) system according to an embodiment of the present invention perform a QR operation on a received signal, calculate a log likelihood ratio (LLR) through multiple dimension detection, regenerate a symbol corresponding to a demodulated data stream using the LLR, remove interference from the output vector of the QR operation using the regenerated symbol, performing zero forcing using a weight for the interference removed output vector and the inverse matrix, the result of zero forcing is demodulated. Therefore, reception performance can be improved with hardware complexity reduced.

BRIEF DESCRIPTION OF THE DRAWINGS

FIG. 5 is a diagram illustrating a structure of a transmission frame.

BEST MODE FOR CARRYING OUT THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 3:
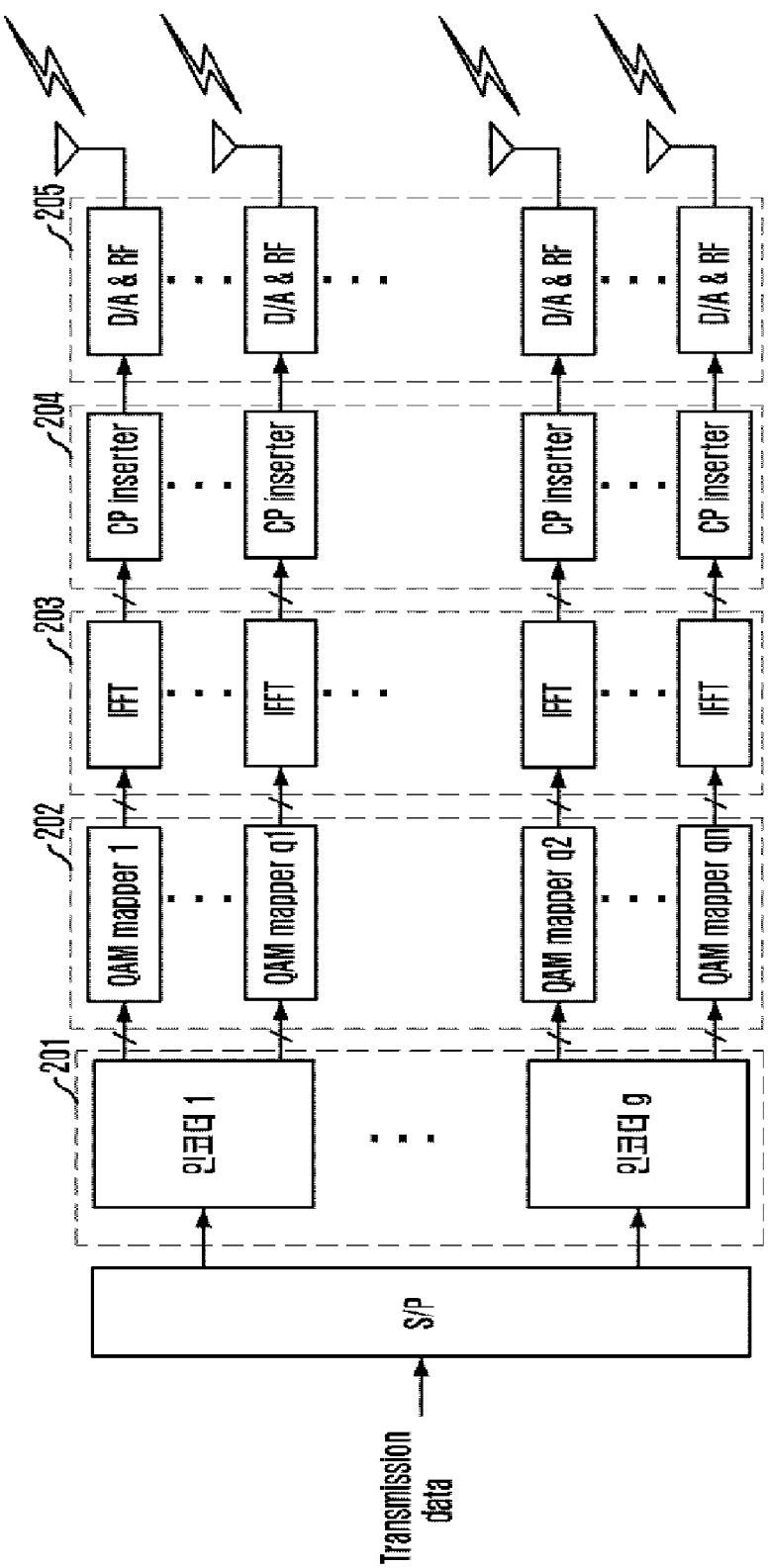
FIG. 3 is a diagram schematically illustrating a transmitting ending of a MIMO-OFDM system where the present invention is applied.

FIG. 3 is a block diagram schematically illustrating a transmitting end of a multiple input multiple output (MIMO) orthogonal frequency division multiplexing (OFDM) system where the present invention is applied.

Referring to FIG. 3, the transmitting side includes a serial/parallel (S/P) converter, g encoders 201, q quadrature amplitude modulation (QAM) mappers 202, a plurality of inverse fast fourier transform (IFFT) units 203, a plurality of cyclic prefix (CP) inserters 204, and digital/analog and radio frequency (D/A & RF) converting units 205, where g and q are integer numbers. The S/P converter receives divides transmission data into a plurality of data rows. The plurality of data rows are input to the g encoders 201. The g encoders 201 are connected to the q QAM mappers 202. Each of the QAM mappers 202 may have distinct channel code rates and modulation schemes.

Figure 1:
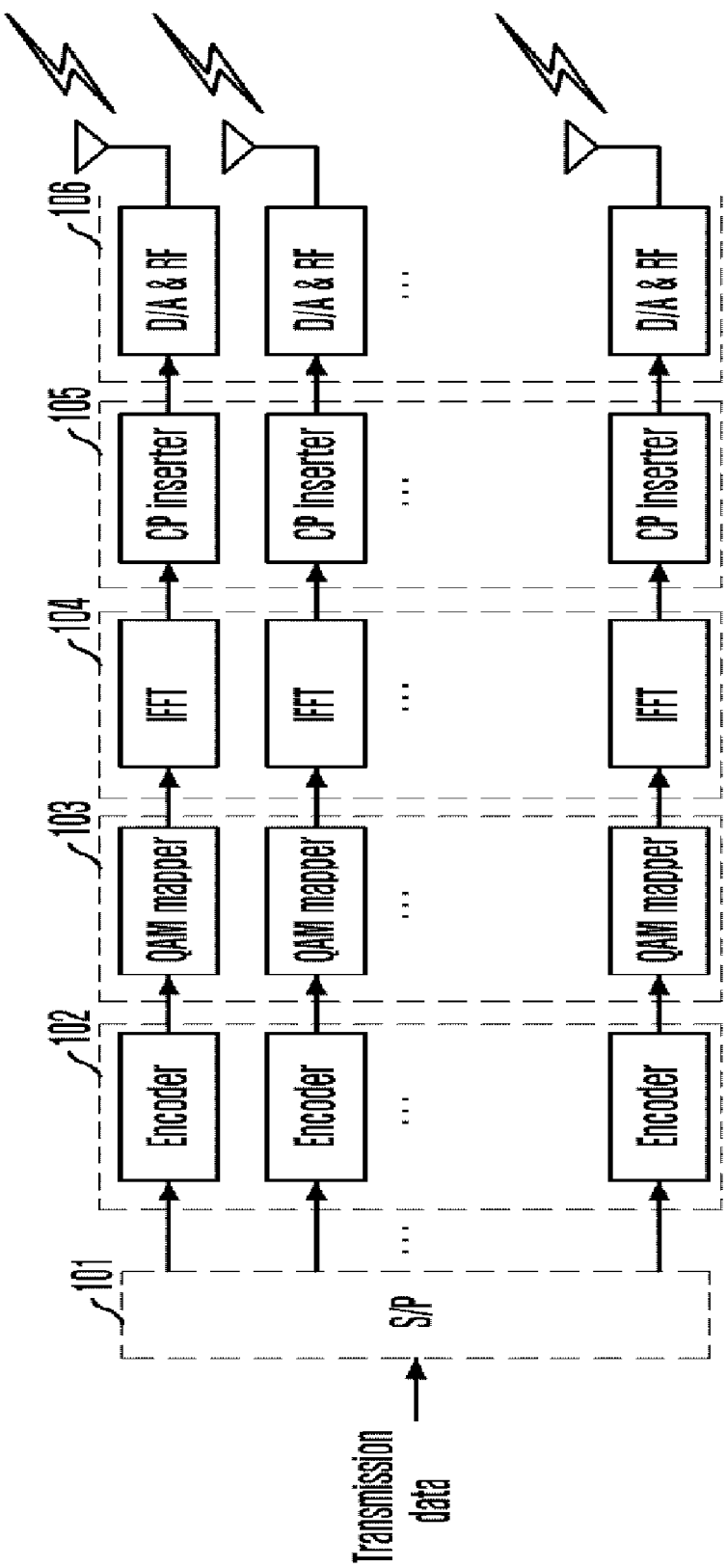
FIGS. 1 and 2 are block diagrams schematically illustrating a multiple input multiple output (MIMO) orthogonal frequency division multiplexing (OFDM) system.
Figure 2:
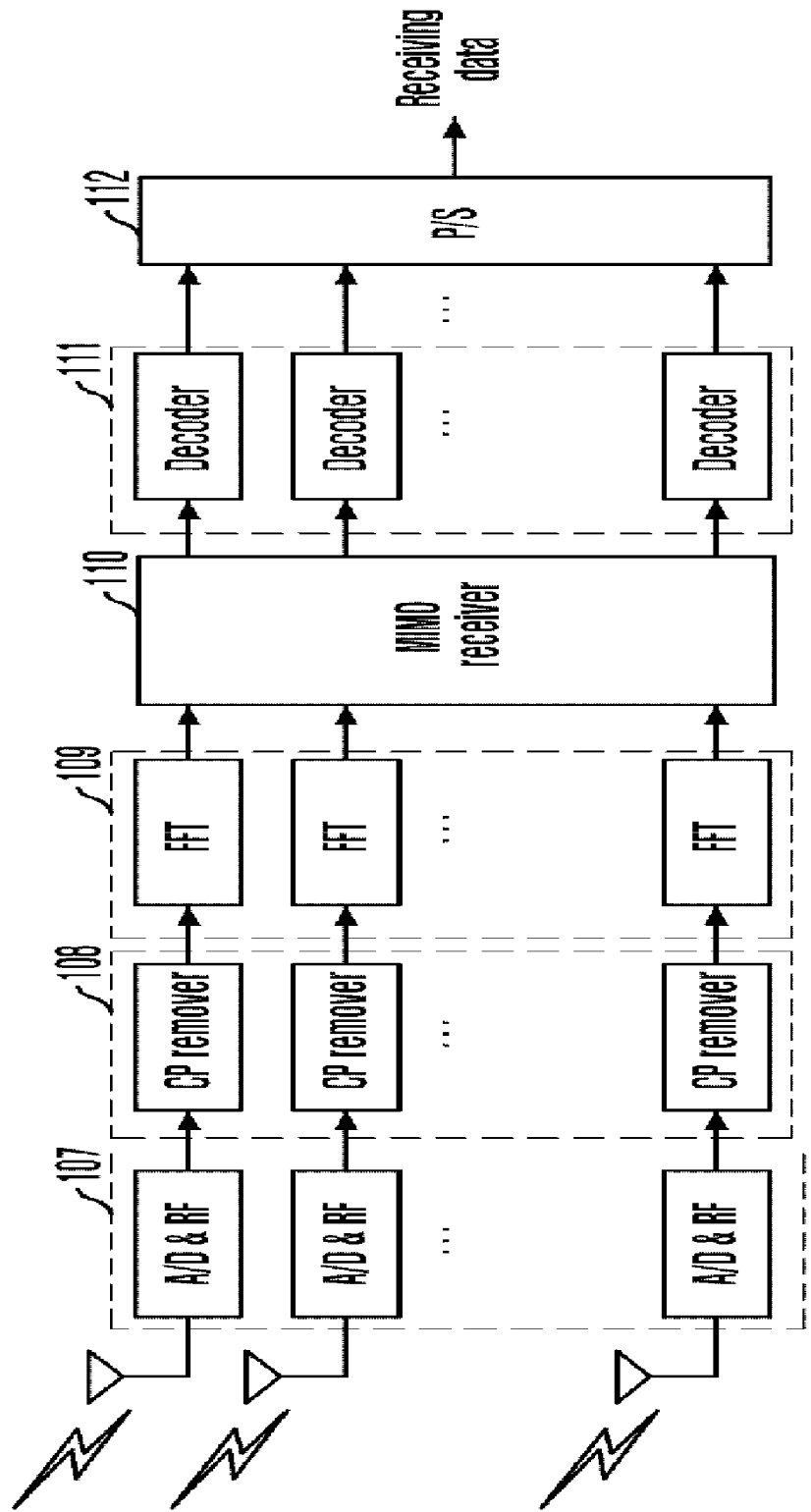

Each of the QAM mappers 202 are sequentially connected to the IFFT units 203, the CP inserters 204, and the D/A & RF units 205. Since the operations of the IFFT units 203, the CP inserters 204, and the D/A & RF units 205 are identical to those shown in FIG. 1a, detailed descriptions thereof are omitted.

Figure 4:
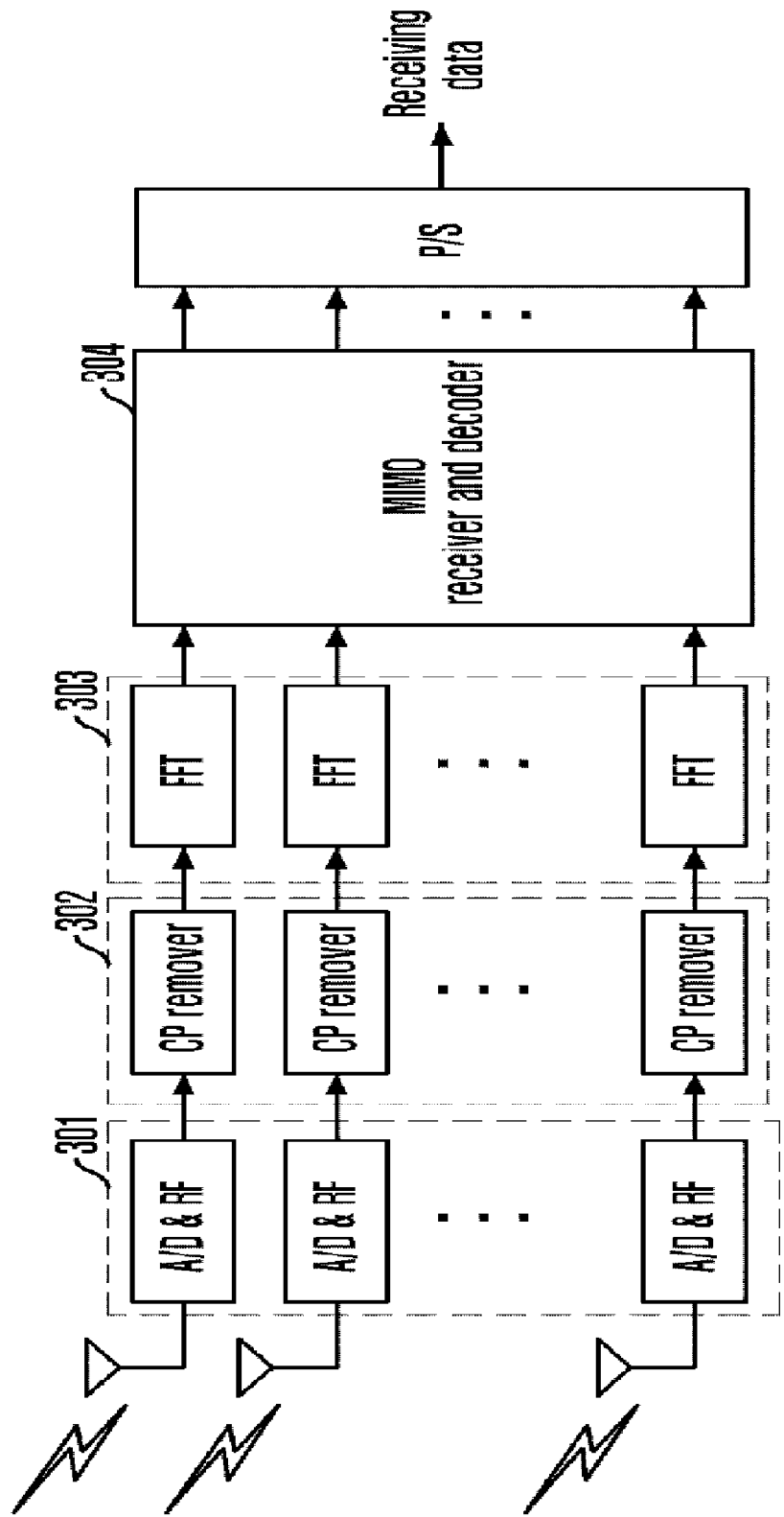
FIG. 4 is a diagram schematically illustrating a receiving ending of a MIMO-OFDM system where the present invention is applied.

FIG. 4 is a diagram schematically illustrating a receiving ending of a MIMO-OFDM system where the present invention is applied.

Referring to FIG. 4, the receiving side includes a plurality of analog/digital and radio frequency (A/D & RF) converting units 301, a plurality of CP removers 302, a plurality of fast fourier transform (FFT) units 303, a MIMO receiving and decoding unit 304, and a P/S converter. The A/D & RF converting unit 301 covert RF signals to analog signals and convert the analog signals to digital signals. The CP removers 302 remove CP codes for a guard interval from the digital signals. The FFT units 303 perform FFT on the CP code removed signals.

The MIMO receiving and decoding unit 304 is a multidimensional receiver and decoder that demodulates fast-fourier transformed symbols.

In the MIMO system, the number N of antennas for receiving a signal is larger than or equal to the number M of antennas for transmitting a signal. After FFT, a received vector Z at a subcarrier can be expressed as Equation 1.

$$z = Hs + n \quad \text{Eq. 1}$$

In Equation 1, the vector Z is $$Z = \begin{bmatrix} Z_1 \\ Z_2 \\ \vdots \\ Z_N \end{bmatrix},$$

a channel H is $$H = \begin{bmatrix} h_{1,1} & h_{1,2} & \cdots & h_{1,M} \\ h_{2,1} & h_{2,2} & \cdots & h_{2,M} \\ \vdots & \vdots & \ddots & \vdots \\ h_{N,1} & h_{N,2} & \cdots & h_{N,M} \end{bmatrix},$$

and a transmitted symbol S is $$S = \begin{bmatrix} S_1 \\ S_2 \\ \vdots \\ S_M \end{bmatrix}.$$

After performing the QR operation, the received signal can be expressed as Equation 2.

$$y = \begin{bmatrix} y_1 \\ y_2 \\ \vdots \\ y_N \end{bmatrix} \quad \text{Eq. 2}$$

$$= Q^H z$$

$$= Rs + n'$$

$$= \begin{bmatrix} r_{1,1} & r_{1,2} & \cdots & r_{1,M} \\ 0 & r_{2,2} & \cdots & r_{2,M} \\ 0 & \vdots & \ddots & \vdots \\ 0 & \cdots & 0 & r_{N,M} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_N \end{bmatrix}$$

Equation 2 can be simplified into a below equation.

$$y = \begin{bmatrix} y_1 \\ y_2 \\ \vdots \\ y_M \end{bmatrix}$$

$$= Q^H z$$

$$= Rs + n'$$

$$= \begin{bmatrix} r_{1,1} & r_{1,2} & \cdots & r_{1,M} \\ 0 & r_{2,2} & \cdots & r_{2,M} \\ 0 & \vdots & \ddots & \vdots \\ 0 & \cdots & 0 & r_{M,M} \end{bmatrix} \begin{bmatrix} s_1 \\ s_2 \\ \vdots \\ s_M \end{bmatrix} + \begin{bmatrix} n'_1 \\ n'_2 \\ \vdots \\ n'_N \end{bmatrix}$$

Here, Q is a unitary matrix ($Q^H Q = I$), and R denotes an upper triangular matrix Since the channel matrix H is N×M, the matrix Q is N×M and the matrix R is N×M. The matrix Q can be expressed as follow.

$$Q = \begin{bmatrix} q_{1,1} & q_{1,2} & q_{1,3} & q_{1,4} & \cdots & q_{1,N} \\ q_{2,1} & q_{2,2} & q_{2,3} & q_{2,4} & \cdots & q_{2,N} \\ q_{3,1} & q_{3,2} & q_{3,3} & q_{3,4} & \cdots & q_{3,N} \\ q_{4,1} & q_{4,2} & q_{4,3} & q_{4,4} & \cdots & q_{4,N} \\ \vdots & \vdots & \vdots & \vdots & \ddots & \vdots \\ q_{N,1} & q_{N,2} & q_{N,3} & q_{N,4} & \cdots & q_{N,N} \end{bmatrix}$$

And, the matrix R can be expressed as follow.

$$R = \begin{bmatrix} r_{1,1} & r_{1,2} & \cdots & r_{1,M} \\ 0 & r_{2,2} & \cdots & r_{2,M} \\ \vdots & \vdots & \ddots & \vdots \\ 0 & 0 & \cdots & r_{M,M} \\ 0 & 0 & \cdots & 0 \\ \vdots & \vdots & \ddots & \vdots \\ 0 & 0 & \cdots & 0_{N,M} \end{bmatrix}$$

FIG. 5 is a diagram illustrating a structure of a transmission frame. In general, the transmission frame includes 8 symbols of a long training field (LTF) for estimating a channel, a signal field (SIG) for storing frame information, and a plurality of data symbols. In the present embodiment, the transmission frame is described with M=8 and N=8 for convenience.

Figure 6:
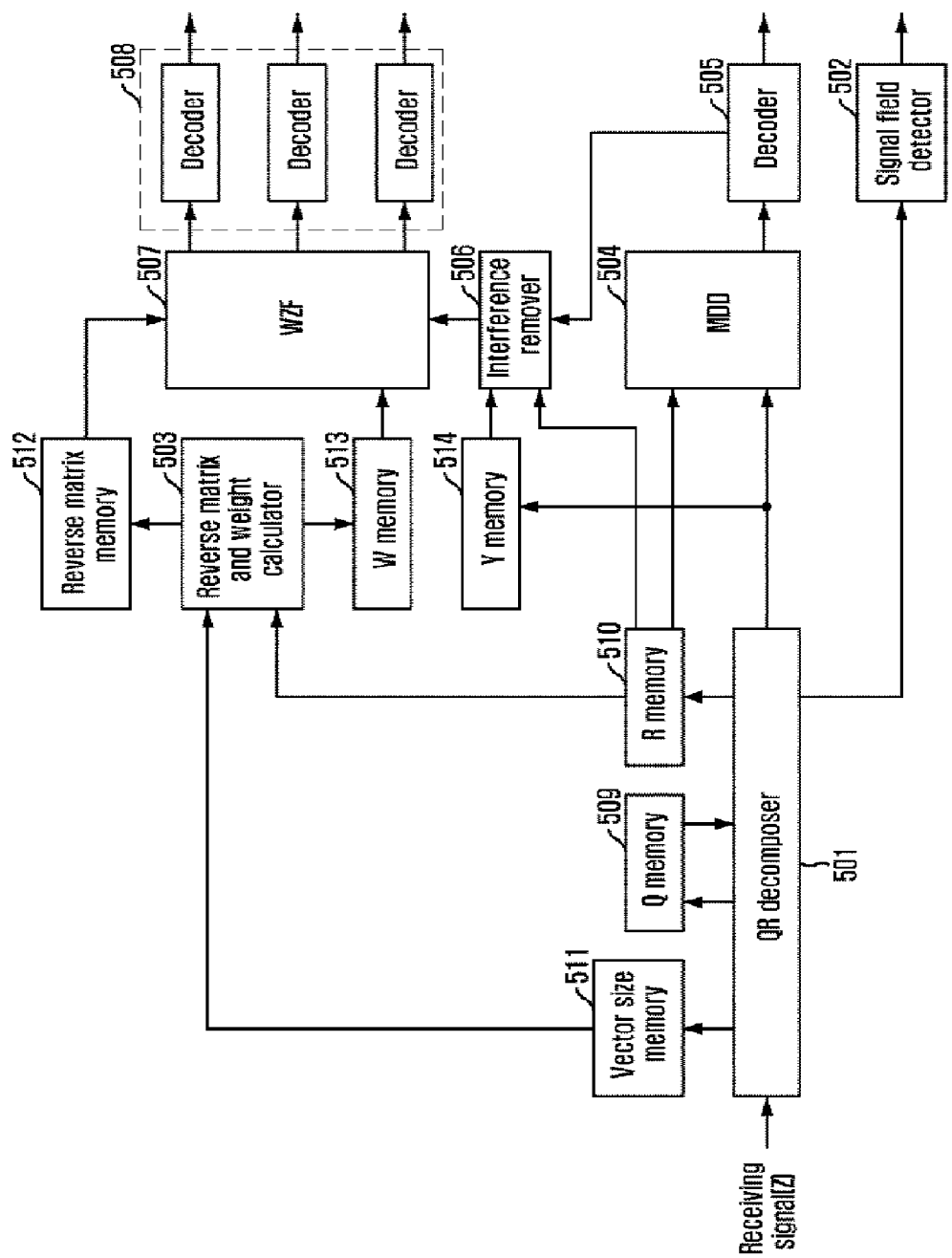
FIG. 6 is a diagram illustrating the MIMO receiving and decoding unit of FIG. 3 in accordance with an embodiment of the present invention.

FIG. 6 is a diagram illustrating the MIMO receiving and decoding unit of FIG. 4 in accordance with an embodiment of the present invention.

Referring to FIG. 6, the MIMO receiving and decoding unit includes a QR decomposer 501, a multi dimension detector (MDD) 504, a inverse matrix and weight calculator 503, an interference remover 506, a weight zero forcing (WZF) unit 507, and a plurality of memories.

The QR decomposer 501 calculates a unitary matrix Q, an upper triangle matrix R, and a vector size through QR operation from a received signal Z for a LTF period. The QR decomposer 501 stores the calculated unitary matrix Q values, upper triangle matrix R values, vector sizes ($1/\sqrt{norm_i}$) of each element of the unitary matrix Q in the memories 509 to 011. Here, norm is equal to $\|q_i\|^2$. The operations of the QR decomposer 501 will be described in more detail with reference to FIG. 10 in later.

The signal field detector 502 detects a signal field from an output vector of the QR decomposers at the SIG period. The inverse matrix and weight calculator 503 reads the upper triangle matrix R values from the R memory 510, reads the vector size ($1/\sqrt{norm}$) from the vector size memory 511, calculates a inverse matrix of the matrix R at the first two symbol periods among data symbols, and calculates a weight for zero forcing. The inverse matrix and weight calculator 503 stores the calculated inverse matrix of the matrix R and the calculated weight in the inverse matrix memory 512 and the W memory 513, respectively.

The multiple dimension detector MDD 504 calculates a log likelihood ratio (LLR) through multiple dimensional detection using the output vector y of the QR decomposer 501 and the upper triangle matrix values of the R memory 510. The operations of the MMD 504 will be described with reference to FIG. 10 in later. The log likelihood ratio (LLR) value, the output of the MDD 504, is input to the channel decoder 505. The channel decoder 505 performs demodulation using the LLR value.

The interference remover 506 receives values of the Y memory and the values of the R memory 510, receives the demodulated data stream from the channel decoder 505, generates a symbol corresponding to the demodulated data stream through symbol mapping, and removes interference from the output vector of the Y memory 514 using the generated symbol. The operations of the interference remover 506 and the inverse matrix and weight calculator 503 will be described with reference to FIG. 13 in later.

The WZF unit 507 receives the interference removed output vector from the interference remover 506, the inverse matrix value of the matrix R from the inverse matrix memory 512, and the weight of the W memory 512. Then, the WZF unit 507 performs zero forcing based on the received output vector, inverse matrix value, and the weight. The log likelihood ration (LLR) value outputted from the WZF unit 507 is input to the channel decoder 508.

Figure 7:
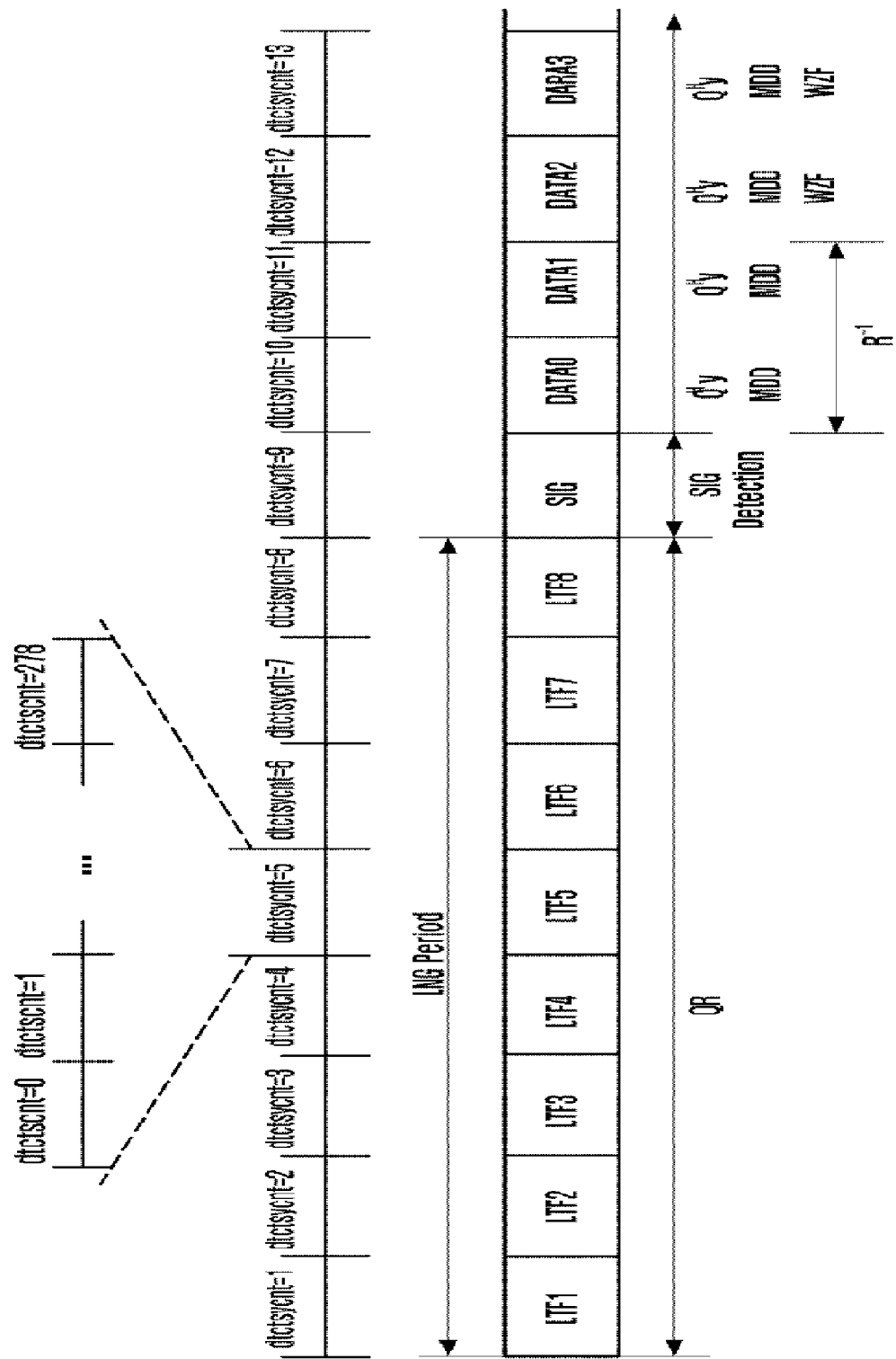
FIG. 7 is a diagram for describing operating timing in a transmission frame structure.

FIG. 7 is a diagram for describing timing for each operation in a transmission frame structure. Referring to FIG. 6, dtctsycnt denotes a symbol count, and dtctscnt is a sample count increasing according to sample in a symbol. In the present embodiment, one symbol is constructed of 288 samples.

Figure 8:
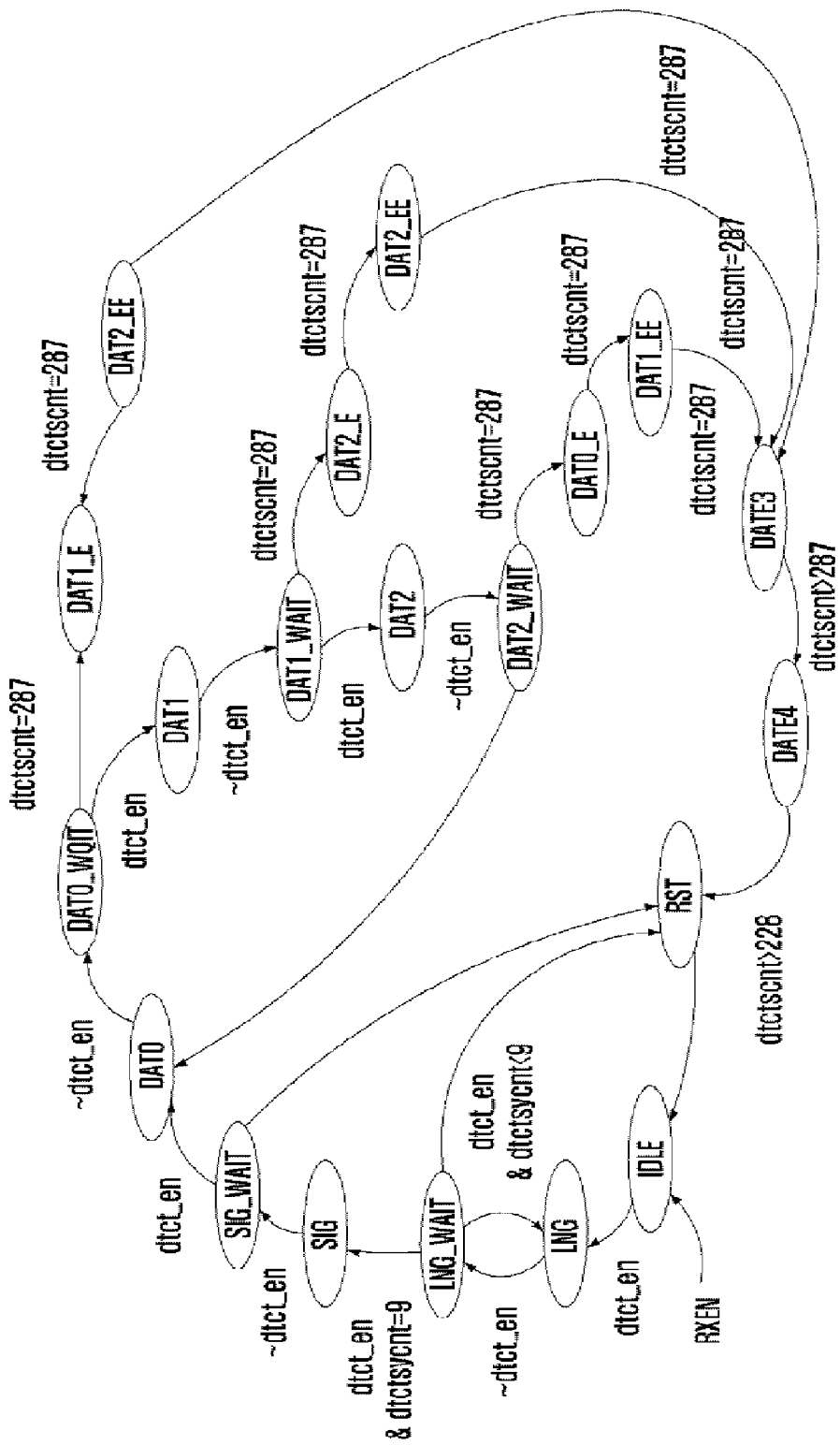
FIG. 8 is a state diagram of a MIMO receiver in accordance with an embodiment of the present invention.

FIG. 8 is a state diagram of a MIMO receiver in accordance with an embodiment of the present invention.

In FIG. 8, RXEN denotes an enable signal for operating a receiver, and dtct_en denotes an enable signal for inputting a received signal z to a MIMO receiver.

Referring to FIG. 8, if a RXEN enable signal and a received signal z are input when the receiver is in an idle state (IDLE), the state transits to a LNG state for detecting a long training field (LTF). It transmits to a SIG state for detecting a signal field if the dtct_en signal is input and dtctsycnt is 9. After the detection of signal field ends, it transits to a data modulation state.

Figure 9:
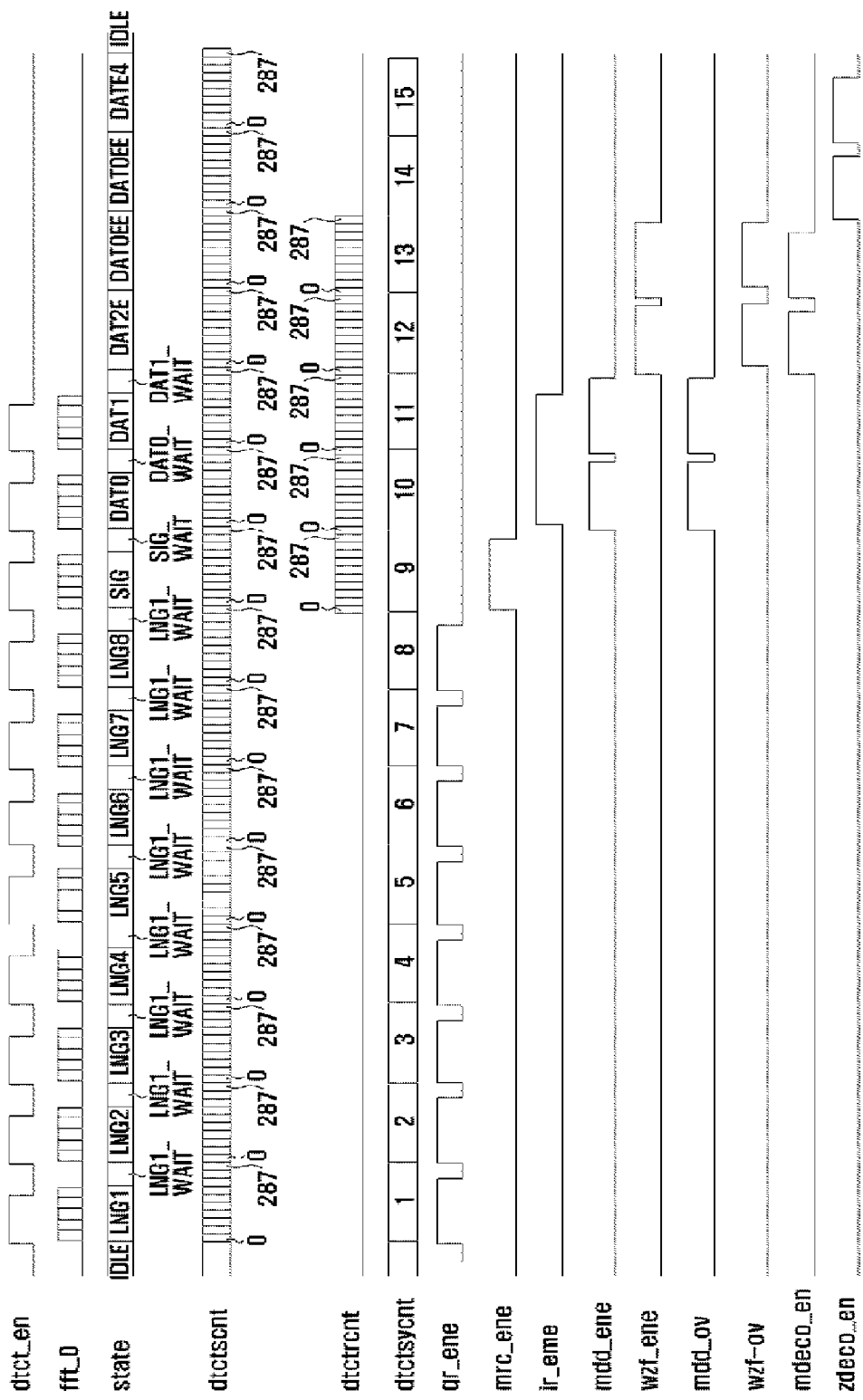
FIG. 9 is a timing diagram illustrating operation timings of a receiver in accordance with an embodiment of the present invention.

FIG. 9 is a timing diagram illustrating operation timings of a receiver. For convenience, FIG. 9 shows the timing diagram when the number of data symbols is two.

Referring to FIG. 9, fft_o denotes a received signal inputted to a MIMO receiver. dtctrcnt is a sample counter which is dtctscnt+1. qr_ene is an enable signal for operating a QR decomposer. mrc_ene is an enable signal for operating the signal field detector 502. And, ir_ene is an enable signal for calculating a inverse matrix of the matrix R by the inverse matrix and weight calculator 503, mdd_ene is an enable signal for operating the multiple dimension detector 504, and wzf_ene is an enable signal for performing zero forcing. mdd_ov is an enable signal for transferring output values of the multiple dimension detector to the channel decoder 505, wzf_ov is an enable signal for transferring the output value of the WZF unit to a decoder, and mdeco_en is an enable signal for transferring the output value of the channel decoder 505. zdeco_en is an enable signal for transferring the output value of the decoder 508 to an upper layer.

Figure 10:
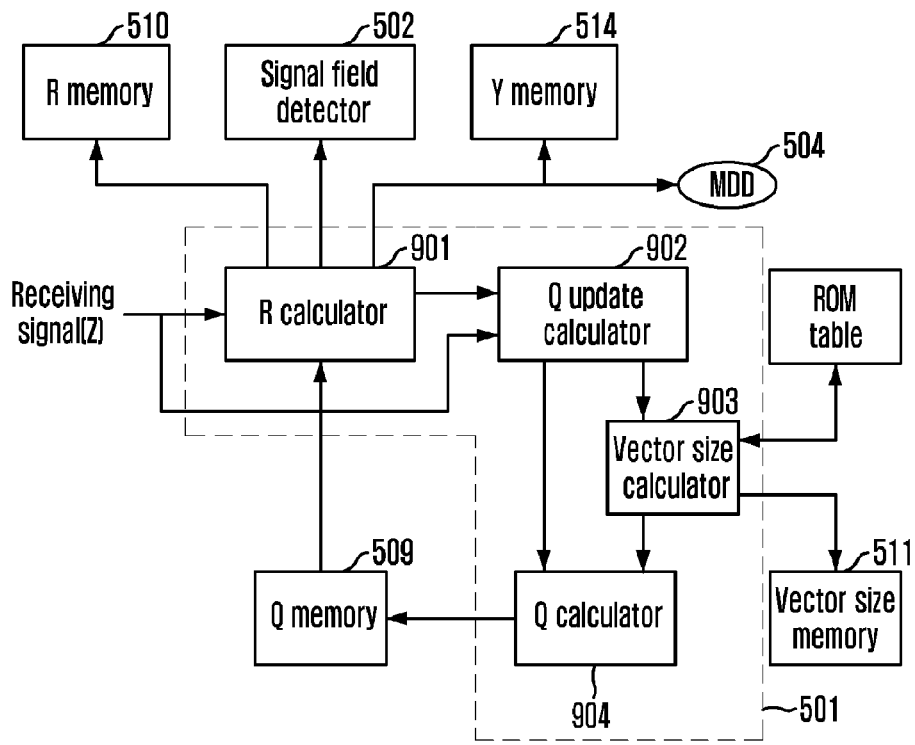
FIG. 10 is a block diagram illustrating a QR decomposer in accordance with an embodiment of the present invention.

FIG. 10 is a block diagram illustrating a QR decomposer in accordance with an embodiment of the present invention.

Referring to FIG. 10, the QR decomposer includes a R calculator 901, a Q update calculator 902, a vector size calculator 903, and a Q calculator 904. The R calculator 901 calculates each element of an upper triangle matrix R from a received signal Z that is an input signal of a MIMO receiver. The R calculator 901 stores the calculated matrix R in the R memory 510. The R calculator provides the calculated matrix R to the signal field detector 502 when the mrc_ene signal is on. The R calculator stores the calculated matrix R in the Y memory 514 and provides the calculated matrix R in the MDD 514 at the same time when the mdd_ene signal is on.

The Q update calculator 902 calculates a Q update matrix for a received signal Z using elements of the calculated matrix R from the R calculator 901. The vector size calculator 903 calculates a norm of a column vector from the calculated Q update matrix and calculates vector sizes $\sqrt{norm}$ and $1/\sqrt{norm}$ from a ROM table. Among the vector sizes calculated by the vector size calculator 903, the vector size ($1/\sqrt{norm}$) is stored in the vector size memory 511.

The Q calculator 904 calculates elements of a unitary matrix Q using the calculated Q update matrix from the Q update calculator 902 and the calculated vector size from the vector size calculator 903, and stores the calculated matrix Q into the Q memory 509. The elements of the matrix Q stored in the Q memory 509 are used for calculating elements of a next R matrix FIG. 11 is a block diagram illustrating a multiple dimension detector (MDD) for deciding $7^{th}$ and $8^{th}$ symbols in accordance with an embodiment of the present invention.

Figure 11:
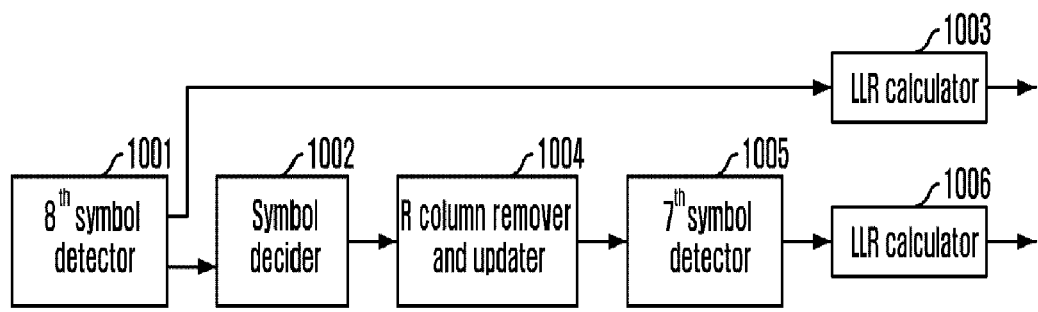
FIG. 11 is a block diagram illustrating a multiple dimension detector (MDD) in accordance with an embodiment of the present invention.

As shown in FIG. 11, an $8^{th}$ symbol detector 1001 calculates distances of each symbol for detecting an $8^{th}$ symbol using the matrix R of the R memory 510, the output vector R of the QR decomposer, which is inputted when the mdd_ene signal is on, and a symbol generated by a symbol generator. The operations of the $8^{th}$ symbol detector 1001 will be described with reference to FIG. 11 in later.

A LLR calculator 1003 calculates a log likelihood ratio (LLR) value for the $8^{th}$ symbol using the calculated distance values from the $8^{th}$ symbol detector 1001.

A symbol decider 1002 decides a symbol having the minimum value among the calculated distance values of each symbol from the $8^{th}$ symbol detector 1001. A R column remover and updater 1004 of the matrix R removes an $8^{th}$ column of a matrix R from the decided $8^{th}$ symbol and updates a signal y.

A $7^{th}$ symbol detector 1005 calculates distances of each symbol for detecting a $7^{th}$ symbol using the updated signal y through the same operation of detecting the $8^{th}$ symbol. A LLR calculator 1006 calculates a LLR value for the $7^{th}$ symbol using the calculated distance values from the $7^{th}$ symbol detector 1005.

Figure 12:
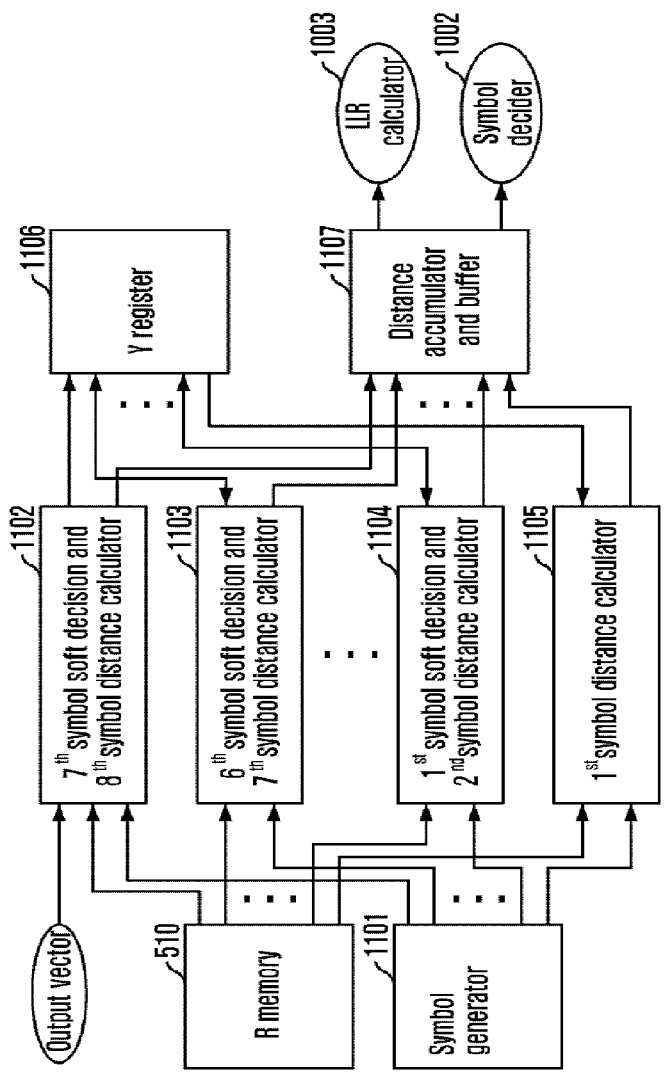
FIG. 12 is a block diagram illustrating an $8^{th}$ symbol detector in accordance with an embodiment of the present invention.

FIG. 12 is a block diagram illustrating an $8^{th}$ symbol detector 1001 shown in FIG. 11 in accordance with an embodiment of the present invention.

Figure 13:
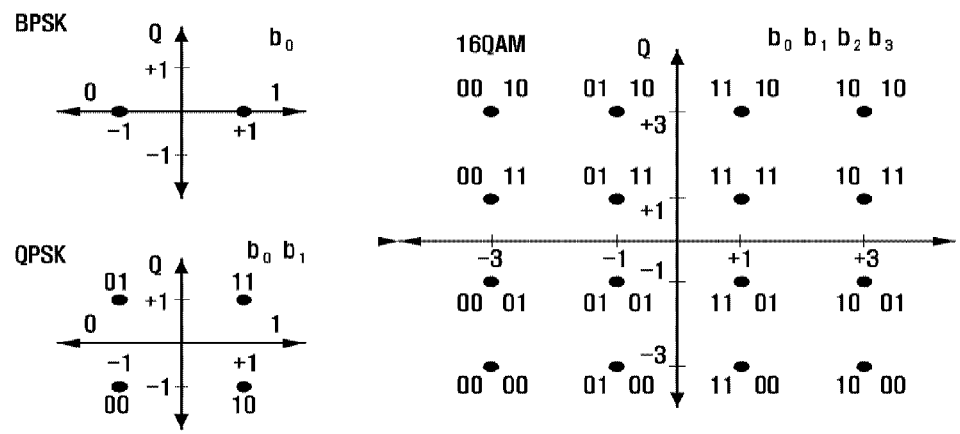
FIGS. 13 and 14 are diagrams for describing a symbol structure having a lattice point.
Figure 14:
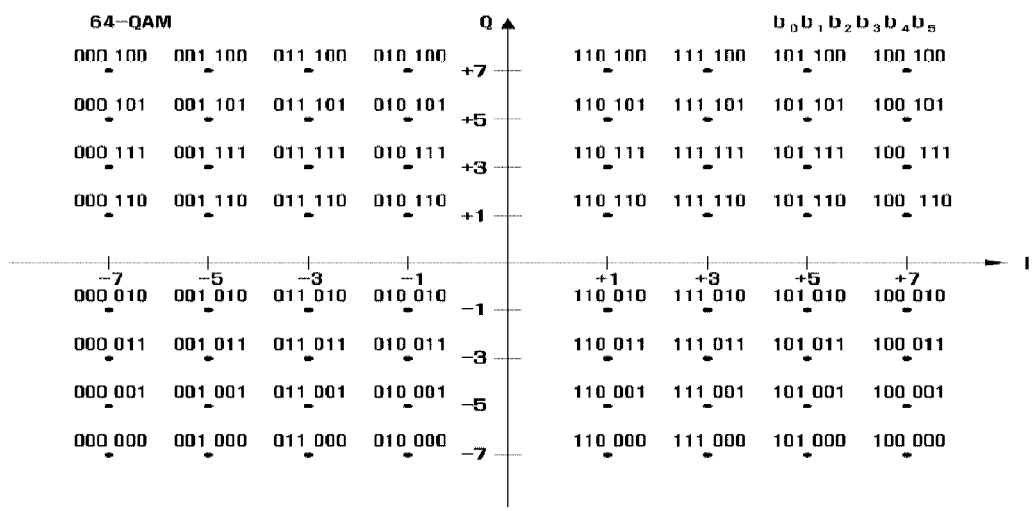

A symbol generator 1001 generates a symbol having lattice points shown in FIGS. 13 and 14. For example, 16QAM has 16 symbol lattice points. Therefore, there are 16 distances. In this case, the 7th symbol soft decision and $8^{th}$ symbol distance calculator 1102 performs soft decision for 16 distances. FIG. 13 shows a symbol structure when a modulation scheme is BPSK, QPSK, or 16QAM. FIG. 14 shows a symbol structure when a modulation scheme is 64 QAM.

A $7^{th}$ symbol soft decision and $8^{th}$ symbol distance calculator 1102 receives an output vector of the QR decomposer when the mdd_ene signal is on, an upper triangle matrix R of the R memory 510, and a symbol generated by the symbol generator 1001, performs hard decision for a $7^{th}$ symbol to detect an $8^{th}$ symbol, and calculates a distance value of the $8^{th}$ symbol. The $7^{th}$ symbol soft decision and $8^{th}$ symbol distance calculator 1102 stores a received signal y which is updated while removing an $8^{th}$ column of a matrix R in a y register 1106.

A $6^{th}$ symbol soft decision and $7^{th}$ symbol distance calculator 1103 receives the updated y value of the y register 1106, a value of the R memory 510, and a symbol generated by a symbol generator, performs soft decision for $6^{th}$ symbol, and calculates a distance value of a $7^{th}$ symbol. A distance accumulator and buffer 1107 accumulates distance values of the $8^{th}$ symbol and $7^{th}$ symbol and stores the accumulated distance value in a register. Also, a $5^{th}$ symbol soft decision and $6^{th}$ symbol distance calculator receives the updated y value of the y register 1106, a value of a R memory, and a symbol generated by a symbol generator, performs soft decision for the $5^{th}$ symbol, and calculates a distance of the $6^{th}$ symbol.

In order to detect an $8^{th}$ symbol, a distance value for a $5^{th}$ symbol, a distance value for a $4^{th}$ symbol, a distance value for a $3^{rd}$ symbol, a distance value 1104 for a $2^{nd}$ symbol, and a distance value 1105 for a $1^{st}$ symbol are calculated through the same operation as described above.

The distance accumulator and buffer 1107 accumulates the calculated distance values of each symbol and stores the accumulated value in a register. The distance values stored in the distance accumulator and buffer 1107 are transferred to the LLR calculator 1003 and the symbol decider 1002.

Figure 15:
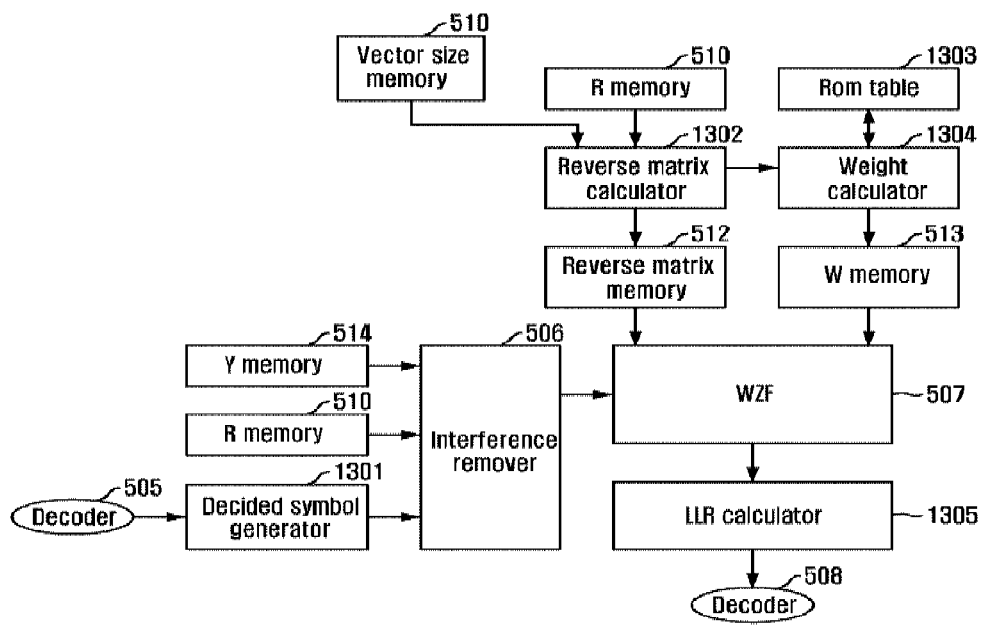
FIG. 15 is a diagram for describing operations of an inverse matrix and weight calculator and a WZF unit in accordance with an embodiment of the present invention.

FIG. 15 is a diagram illustrating an interference remover 506 and a inverse matrix and weight calculator 503 in accordance with an embodiment of the present invention.

The inverse matrix calculator 1302 calculates a inverse matrix of an upper triangle matrix R using the matrix R of the R memory 510 and the vector size ($1/\sqrt{norm}$) of the vector size memory 511. Then, the inverse matrix calculator 1302 stores the calculated inverse matrix in the inverse matrix memory 512.

A weight calculator 1304 calculates a weight as a square of the vector size (norm) of a row of the inverse matrix, calculates 1/weight using a ROM table 1303, and stores the calculated values in the W memory 513.

A decided symbol generator 1301 regenerates a symbol corresponding to a demodulated data stream from the channel decoder 505. The interference remover 506 receives a symbol generated from the decided symbol generator 1301, an output value of the R memory 510, and an output value of the Y memory 514, and removes interference from an output vector of the R memory and the Y memory using the regenerated symbol. If the $8^{th}$ symbol and the $7^{th}$ symbol are removed, the result may be expressed as Equation 3.

$$Y' = \begin{bmatrix} y'_1 \\ y'_2 \\ \vdots \\ y'_6 \end{bmatrix} = Rs + n' = \begin{bmatrix} r_{1,1} & r_{1,2} & \cdots & r_{1,6} \\ 0 & r_{2,2} & \cdots & r_{2,6} \\ 0 & \vdots & \ddots & \vdots \\ 0 & \cdots & 0 & r_{6,6} \end{bmatrix} \begin{bmatrix} s_1 \\ s_2 \\ \vdots \\ s_6 \end{bmatrix} + \begin{bmatrix} n'_1 \\ n'_2 \\ \vdots \\ n'_6 \end{bmatrix} \quad \text{Eq. 3}$$

The WZF unit 507 performs zero forcing using an interference removed output vector Y' from the interference remover 506, an inverse matrix of the inverse matrix memory 512, and a weight of the W memory 513. The LLR calculator 513 calculates a log likelihood ratio (LLR) of a symbol from the output value of the WZF unit 507 and transfers the calculated LLR to the decoder 508.

Figure 16:
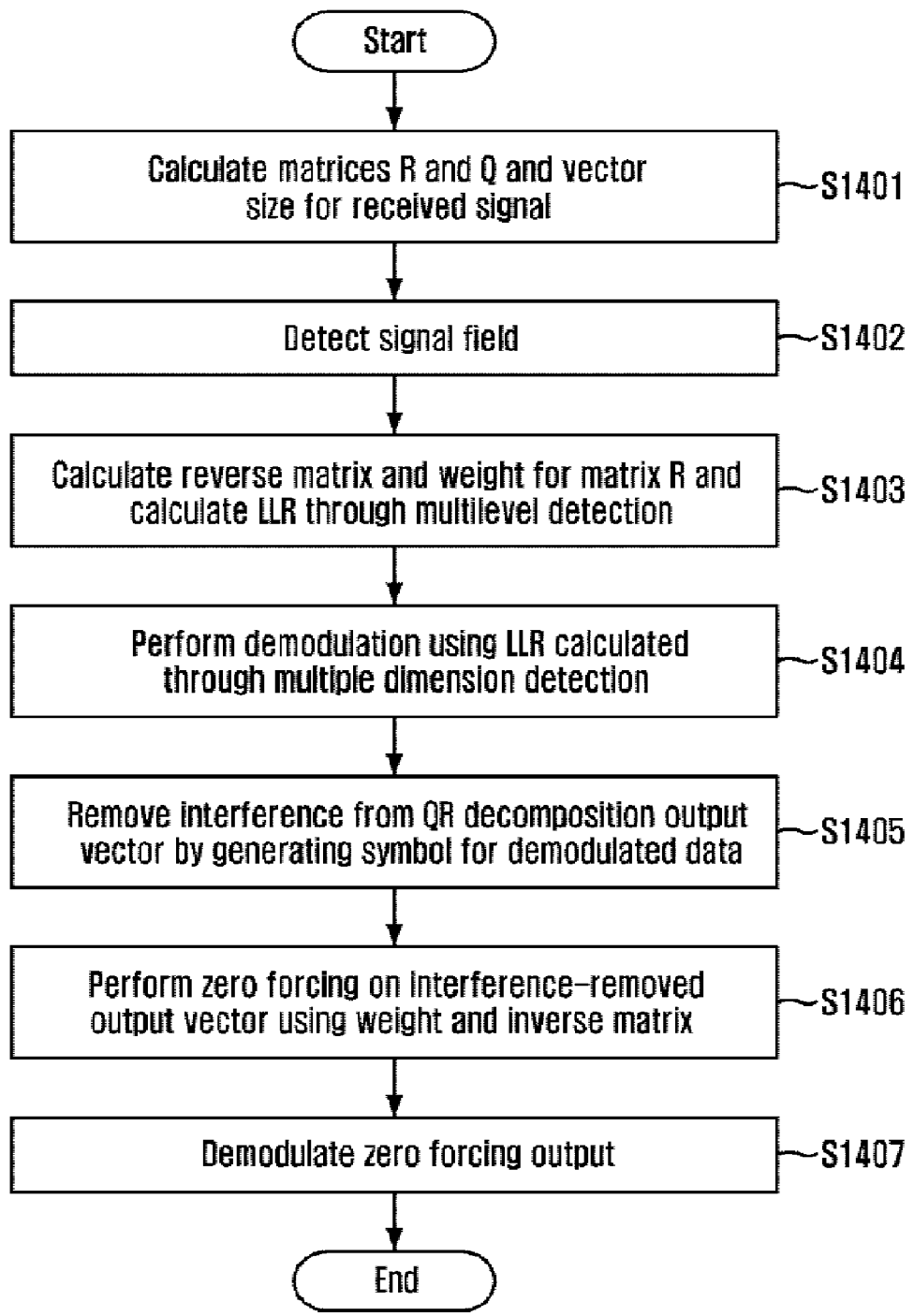
FIG. 16 is a flowchart illustrating a method for receiving a signal for a MIMO system in accordance with an embodiment of the present invention.

FIG. 16 is a flowchart illustrating a method for receiving a signal for a MIMO system in accordance with an embodiment of the present invention.

Since a MIMO receiving method according to the present embodiment was already described when the MIMO receiving apparatus was described above, the MIMO receiving method will be described briefly with reference to FIG. 14.

At step S1401, an unitary matrix Q, an upper triangle matrix R, and a vector size are calculated through performing a QR operation on a received signal z obtained through FFT.

At step S1402, a signal field is detected from the result of the QR operation. Then, an inverse matrix of the matrix R is calculated using the vector size and the upper triangle matrix R, and a weight is calculated using the inverse matrix of the matrix R and a ROM table. At step S1403, distance values for symbols are calculated through multiple dimensional detection, and a LLR is calculated using the calculated distance values. At step S1404, demodulation is performed using a LLR of an $8^{th}$ symbol and a $7^{th}$ symbol, which is calculated through multiple dimensional detection. At step S1405, a symbol is generated corresponding to the demodulated data stream, and interference is removed from an output vector calculated in the QR operation using the generated symbol. At step S1406, zero forcing is performed using a weight for the interference removed output vector and the inverse matrix of the matrix R. At step S1047, the result of zero forcing is demodulated.

The embodiments of the present invention was described with an assumption that the number of antennas for transmitting and receiving is 8 and the number of data symbols is 2. However, the present invention may be identically applied although the number of antennas and the number of data symbols are changed.

As described above, the technology of the present invention can be realized as a program. A code and a code segment forming the program can be easily inferred from a computer programmer of the related field. Also, the realized program is stored in a computer-readable recording median, i.e., information storing media, and is read and operated by the computer, thereby realizing the method of the present invention. The recording median includes all types of recording media which can be read by the computer.

The present application contains subject matter related to Korean Patent Application No. 2007-0133823, filed in the Korean Intellectual Property Office on Dec. 19, 2007, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. A receiving apparatus of an orthogonal frequency division multiplexing (OFDM) based multiple input multiple output (MIMO) system, comprising:
    a QR decomposing means for calculating an unitary matrix Q, an upper triangle matrix R, and a vector size for a received signal;
    a multiple dimension detecting means for calculating a first log likelihood ratio (LLR) for an output of the QR decomposing means through multiple dimension detection;
    an inverse matrix and weight calculating means for calculating an inverse matrix for the upper triangle matrix R and a weight;
    an interference removing means for regenerating a symbol for a demodulated data stream using the first LLR and removing interference from an output vector of the QR decomposing means using the regenerated symbol;
    a weight zero forcing means for performing zero forcing on the interference removed output vector from the interference removing means using the inverse matrix of the upper triangle matrix R and the weight and calculating a second LLR;
    a signal field detection means for receiving an output vector of the QR decomposing means and detecting a signal field from the output vector;
    a first decoding means for performing demodulation using the first LLR outputted from the multiple dimension detecting means; and
    a second decoding means for performing demodulation using the second LLR outputted from the weight zero forcing means.

2. The receiving apparatus of claim 1, wherein the QR decomposing means includes:
    an R calculating unit for calculating an upper triangle matrix R for the received signal;
    a Q update calculating unit for receiving the calculated upper triangle matrix and the received signal and calculating an update matrix Q of a unitary matrix;
    a vector size calculating unit for calculating a vector size using the update matrix of the Q update calculating unit and a read only memory (ROM) table value; and
    a Q calculating unit for calculating a unitary matrix Q using an output of the vector size calculating unit and an output of the Q update calculating unit.

3. The receiving apparatus of claim 2, wherein the R calculating unit stores the upper triangle matrix in a first memory (R memory) when a QR enable signal is on, transfers the upper triangle matrix to the signal field detecting means when an enable signal for signal field detection is on, and stores the upper triangle matrix in a second memory (Y memory) and transfers the upper triangle matrix to the multiple dimension detecting means at the same time when an enable signal for multiple detection is on.

4. The receiving apparatus of claim 3, wherein the interference removing means includes:
    a decided symbol generator for regenerating a symbol using the demodulated data stream from the first decoding means; and
    an interference remover for removing the regenerated symbol from an upper triangle matrix stored in the first memory and an upper triangle matrix stored in the second memory.

5. The receiving apparatus of claim 2, wherein the vector size calculating unit calculates a vector size (norm) of a column vector from the update matrix of the Q update calculating unit, calculates $\sqrt{\text{norm}}$ and $1/\sqrt{\text{norm}}$ using the ROM table, and stores the $\sqrt{\text{norm}}$ at a third memory for calculating an inverse matrix of the upper triangle matrix R.

6. The receiving apparatus of claim 2, wherein the Q calculating unit stores the calculated unitary matrix Q in a fourth memory (Q memory) for calculating elements of a next upper triangle matrix R.

7. The receiving apparatus of claim 1, wherein the multiple dimension detecting means includes:
    a first symbol detecting unit for calculating a symbol distance value for detecting an 8th symbol using an output vector of the QR decomposing means;
    a first log likelihood ratio (LLR) calculating unit for calculating a LLR using the symbol distance value outputted from the first symbol detecting unit;
    a symbol deciding unit for deciding a symbol having a minimum value among the symbol distance values of the first symbol detecting unit;
    a column removing and y updating unit for removing an $8^{th}$ column of the upper triangle matrix R from the decided $8^{th}$ symbol from the symbol deciding unit and updating a signal y;
    a second symbol detecting unit for calculating a symbol distance value for detecting a $7^{th}$ symbol using the updated signal y; and
    a second log likelihood ratio (LLR) calculating unit for calculating a LLR using the symbol distance values outputted from the second symbol detecting means.

8. The receiving apparatus of claim 7, wherein the first symbol detecting unit includes:
    a symbol generator for generating a symbol having a lattice point;
    a symbol distance calculator for receiving the upper triangle matrix R of the QR decomposing means and a symbol generated by the symbol generator, performing soft decision for the symbol, and sequentially calculating symbol distance values; and
    an accumulating and buffering unit for accumulating the calculated distance values of the symbol distance calculator and storing the accumulated distance value.

9. The receiving apparatus of claim 1, wherein the inverse matrix and weight calculating means includes:
   an inverse matrix calculator for receiving a vector size and an upper triangle matrix and calculating an inverse matrix of the upper triangle matrix; and
   a weight calculator for calculating a weight using an output of the inverse matrix calculator and the ROM table.

10. The receiving apparatus of claim 9, wherein the weight calculator calculates a weight by squaring a vector size of a row of the inverse matrix calculated by the inverse matrix calculator, and calculates 1/weight from the ROM table.

11. A receiving method of an orthogonal frequency division multiplexing (OFDM) based multiple input multiple output (MIMO) system, comprising:
   performing QR decomposing for calculating an unitary matrix Q, an upper triangle matrix R, and a vector size for a received signal;
   calculating a first log likelihood ratio (LLR) by performing multiple dimension detection on the result of said the QR decomposing;
   calculating an inverse matrix for the upper triangle matrix R and calculating a weight;
   regenerating a symbol for a demodulated data stream using the first LLR and removing interference from the result of the QR decomposing using the regenerated symbol;
   performing zero forcing on the interference removed output vector using the inverse matrix of the upper triangle matrix R and the weight and calculating a second LLR;
   detecting a signal field from the result of the QR decomposing;
   performing demodulation using the first LLR; and
   performing demodulation using the second LLR.

12. The receiving method of claim 11, wherein said performing QR decomposing includes:
   calculating the upper triangle matrix R for the received signal;
   calculating an update matrix for a unitary matrix Q using the calculated upper triangle matrix and a received signal;
   calculating a vector size using the update matrix and a ROM table value; and
   calculating an unitary matrix Q using the vector size and the update matrix.

13. The receiving method of claim 12, wherein a vector size (norm) of a column vector is calculated from the update matrix, and $\sqrt{\text{norm}}$ and $1/\sqrt{\text{norm}}$ are calculated using the ROM table.

14. The receiving method of claim 12, wherein said calculating a first LLR includes:
   calculating a symbol distance value for detecting an 8th symbol using an output vector of the QR decomposing;
   calculating a LLR using the symbol distance value outputted from said calculating a symbol distance value;
   deciding a symbol having a minimum value among the symbol distance values calculated from said calculating a symbol distance value;
   removing an $8^{th}$ column of the upper triangle matrix R from the decided $8^{th}$ symbol and updating a signal y;
   calculating a symbol distance value for detecting a $7^{th}$ symbol using the updated signal y; and
   calculating a LLR using the symbol distance values calculated from said calculating a symbol distance value.

15. The receiving method of claim 14, wherein said calculating a symbol distance value includes: generating a symbol having a lattice point;
   performing soft decision for the generated symbol and sequentially calculating symbol distance values using the upper triangle matrix R, and the updated signal y with an 8th column of the upper triangle matrix removed; and
   accumulating the calculated distance values and storing the accumulated distance values.

16. The receiving method of claim 12, wherein said calculating an inverse matrix includes:
   calculating an inverse matrix of the upper triangle matrix using a vector size and an upper triangle matrix; and
   calculating a weight using the inverse matrix of the upper triangle matrix and the ROM table.

17. The receiving method of claim 16, wherein the weight is calculated by squaring a vector size of a row of the inverse matrix and 1/weight is calculated using the ROM table.

* * * * *